Jan. 5, 1960  C. W. LINCOLN ET AL  2,919,679
FLUID POWER STEERING GEAR WITH DAMPING FEATURE
Filed June 14, 1954  2 Sheets-Sheet 1
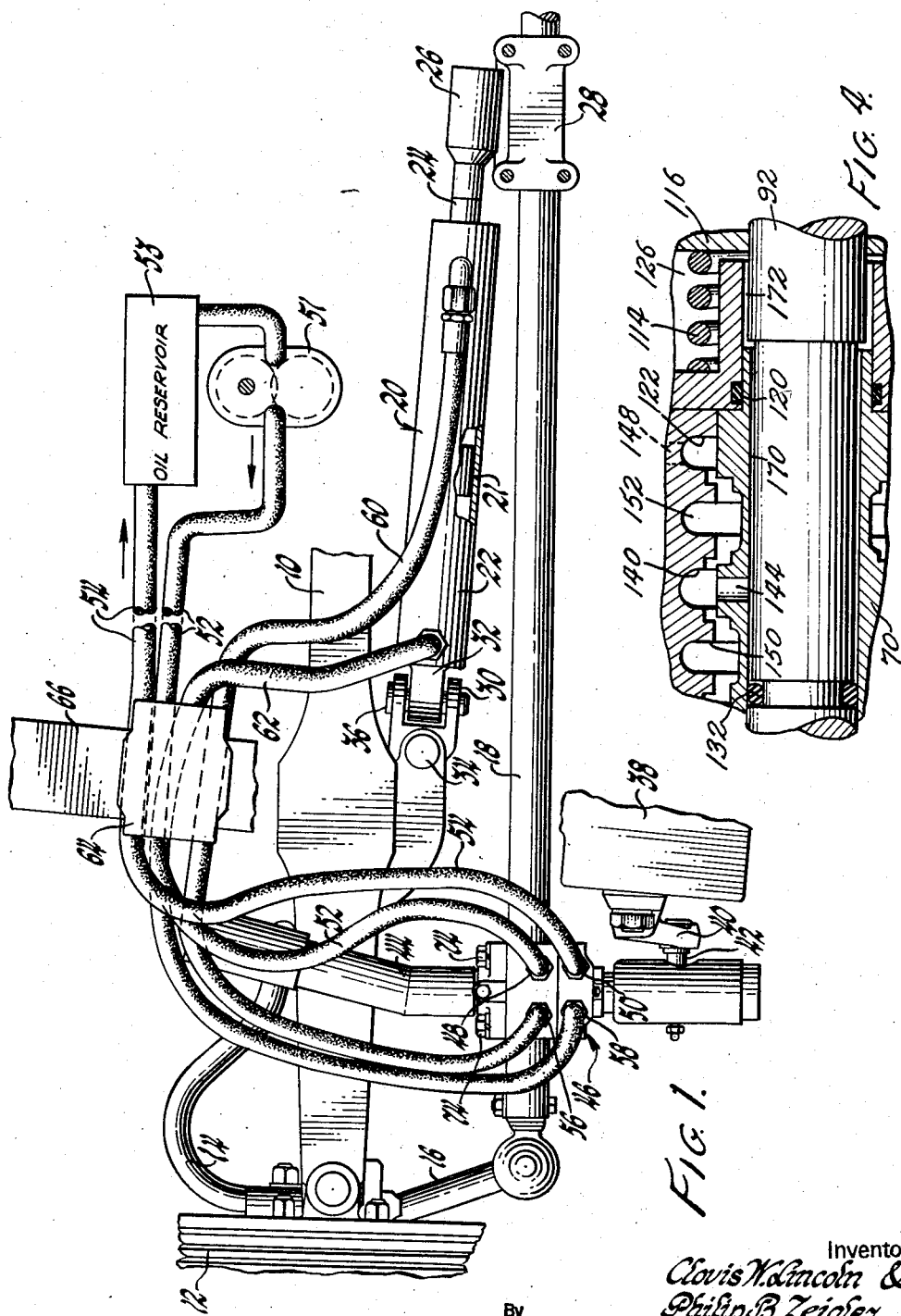
Inventors
Clovis W. Lincoln &
Philip B. Zeigler
By C. H. Hibbe
Attorney

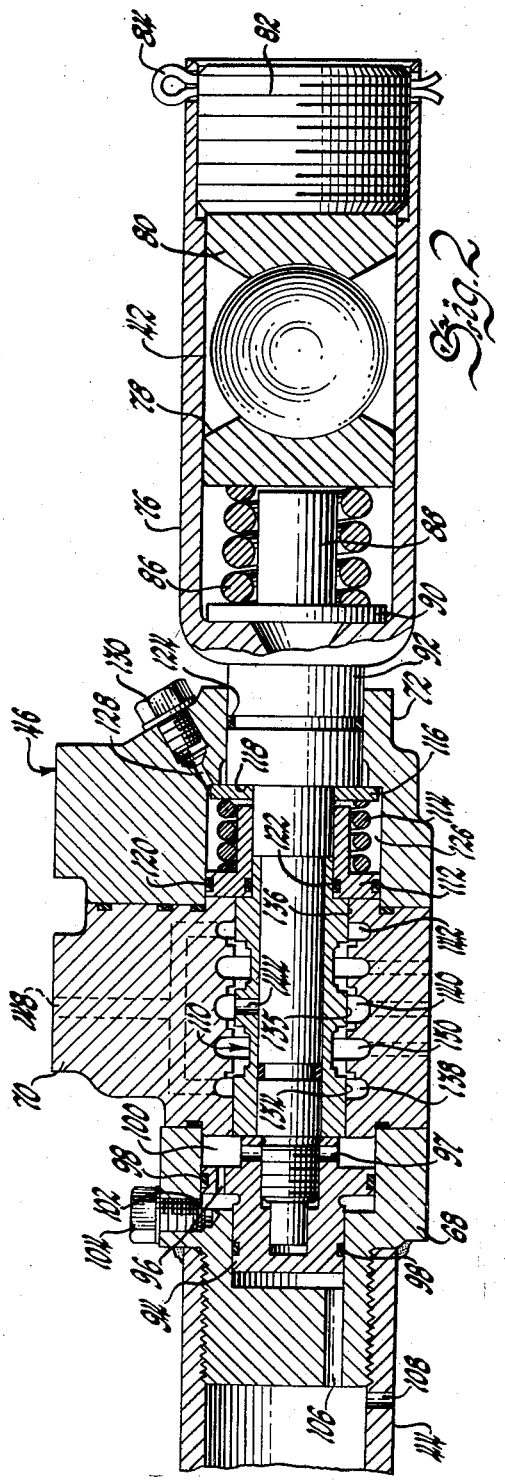

United States Patent Office 2,919,679
Patented Jan. 5, 1960

2,919,679

FLUID POWER STEERING GEAR WITH DAMPING FEATURE

Clovis W. Lincoln and Philip B. Zeigler, Saginaw, Mich., assignors to General Motors Corporation, Detroit, Mich., a corporation of Delaware Application June 14, 1954, Serial No. 436,313

3 Claims. (Cl. 121—46.5)

This invention relates to fluid power steering, especially of automotive vehicles, and more specifically concerns a fluid power steering control valve particularly adapted for power steering systems of the type used on trucks and other heavy vehicles.

There are two general types of fluid power steering gears presently in use, namely the "integral" type as represented, for example, by the gear described in Davis Patent 2,213,271, wherein the valve controlling the fluid flow is associated with and actuated by movement of the steering shaft and the power is applied to the pitman arm; and the so-called "booster" type gears, which differ in that the valve is otherwise positioned and actuated, and in that the power is applied to a steering linkage member beyond the pitman or drop arm.

Although the booster gears offer pronounced advantages from the standpoint of cost and ease of installation, those thus far proposed for use on trucks and the like have been found lacking in one or more important respects. In general, these gears are subject to objection on the ground that they represent a sacrifice of sensitivity and responsiveness in the interest of ruggedness and durability. This deficiency is perhaps not of too great significance as to off-the-road vehicles, for instance, but is of serious concern with relation to delivery vehicles and the like, which must be maneuvered in heavy traffic and crowded quarters.

The present invention aims to provide a booster gear suited for application to trucks, which meets all of the above indicated requirements.

A further object is to provide a booster gear showing excellent reversibility, with no tendency toward oversteering, and which gives the driver a road "feel" at all times.

Another object is to provide a gear having the ability to dampen out road shocks, normally transmitted to the steering wheel. Still another object is to provide a booster gear in the operation of which the return of the dirigible wheels, induced by the geometry of the steering linkage, is not marked by an "overshooting" of the normal straight ahead position of these wheels.

Other and more specific objects and features of the invention will appear from the following description which will proceed with reference to the accompanying drawings in which:

Figure 1 is a fragmentary plan view of a steering system incorporating the invention, certain auxiliary parts being shown diagrammatically; and Figure 2 is a longitudinal section showing the inner workings of the valve component of the power steering apparatus, and the means through which the valve is actuated;

Figure 3 is an enlarged fragmentary section of the valve; and

Figure 4 is another fragmentary view of the valve, provided to illustrate certain clearances.

Referring first to Figure 1, the numeral 10 denotes the front axle of a motor vehicle, a five-ton truck for example.

Operatively connected to the dirigible wheel 12 in the conventional manner is a pair of steering arms 14, 16, the latter being linked to a tie rod 18 connected at its opposite end to the counterpart of the arm 16. There is no counterpart of the steering arm 14.

The axle 10 and the tie rod 18 are interconnected through a fluid motor 20. This motor includes a piston 21, confined within the cylinder 22, having fixed thereto or integral therewith a shaft 24 anchored to the tie rod through an adapter 26 and a special fitting 28. The cylinder 22 is attached to the axle 10 by means of a universal connection comprising yokes 30 and 32 and pins 34 and 36, yoke 30 being fixed to the axle.

Positioned above the members so far described is a casing 38 housing means whereby the rotary movement of the steering shaft, not shown, is translated into a rocking motion of the pitman arm 40. Such arm, which will be seen as terminating in a ball stud 42 extending at right angles thereto, is interconnected with the previously mentioned steering arm 14 via a drag link 44 carrying as a part thereof a control valve 46 for the fluid motor 20. This valve is provided with a pair of hose fittings 48 and 50 for hoses 52 and 54, which extend, respectively, to a pump 51, powered as from the crankshaft of the engine of the vehicle, and to an oil reservoir 53 from which the pump draws, hose 52 thus representing the inlet line to the valve, hose 54 the outlet or return line. As indicated, hydraulic operation of the subject booster is preferred, but the same may be adapted for air or vacuum operation, for example.

In addition to the fittings 48 and 50, the valve 46 carries fittings 56 and 58 corresponding to hose sections 60 and 62 respectively. Hose 60 extends to the right-hand end of the cylinder 22, hose 62 to the left-hand end thereof. All of these sections extend through a manifold support 64 suitably secured to the frame of the vehicle 66.

Going now to Fig. 2, it will be seen that the housing of the valve 46 is comprised of three members 68, 70 and 72 fastened together by means of bolts 74, two of which will be seen in Fig. 1. The assembly has a threaded connection with the drag link 44 through the member 68.

A casing 76 to the right of the valve confines seats 78, 80 for the ball portion of the ball stud 42 at the end of the pitman arm 40. The right-hand end of the casing is closed by a threaded plug 82 secured against loosening by cotter pin 84.

Ball seat 78 is loaded by a spring 86 encircling the shank portion 88 of a plug 90, the outer face of which bears against the inner vertical wall of the casing 76.

Fixed to or integral with the casing 76 is a stepped shaft or stem 92 terminating at its left-hand end in an internally threaded piston 94 apertured at 96, and at 97, and peripherally grooved to accommodate annular oil seals 98.

The chamber 100 within which the piston 94 is confined is formed by the boring and counterboring of the valve housing member 68. Such member has a threaded aperture 102 therein through which fluid may be introduced into the chamber. This aperture serves as an air bleed during the initial filling of the chamber with fluid. With the filling complete, the aperture is closed by a threaded plug 104. A passageway 106 in the housing member 68 cooperates with a passageway 108 in the drag link 44 to permit the egress of fluid passing the oil seal 98.

The valve housing member 70 confines a spool 110 held between the piston 94 and a safety plug 112 loaded by a spring 114, which encircles the shank portion of the safety plug and bears at its opposite end against a ring 116 abutting the annular shoulder 118 formed incident to the stepping of the stem 92.

Plug 112 is grooved to accommodate inner and outer oil seals 120, 122. To the right of shoulder 118, shaft 92 is annularly recessed to accommodate an oil seal 124.

The chamber 126 is formed by the boring and counterboring of the valve housing member 72. A passageway 128, shown closed by a threaded plug 130, provides an air bleed during the initial filling of the chamber. Within the spool 110, the stem 92 is grooved to accommodate a second oil seal 132.

Spool 110 comprises three lands 134, 135, 136 functional with relation to annular channels 138, 140 and 142 respectively, in the valve housing member 70. The center land 135 has a passageway 144 therein for a purpose which will later appear.

Annular channel 140 represents the valve inlet channel, being open to a passageway 146 receiving fluid through hose 52 from the pump 51 (Fig. 1). Channels 138 and 142 both communicate with a passageway 148 corresponding to hose 54 (Fig. 1) extending to the reservoir 53.

In addition to channels 138 and 142, valve housing member 70 includes annular channels 150 and 152 opening, respectively, to passageways 154 and 156 corresponding respectively to hose sections 60 and 62 (Fig. 1).

It should be here injected that the passageways in the valve housing member 70 indicated in dotted lines are shown out of their true position in the interest of simplifying the description.

The fit of stem 92 within the spool 110 and within the safety plug 112, while tight, permits fluid flow from the annular channel 140 via a radial passage 144 in the valve spool to the chamber 126. Thus, the fluid pressure in the chamber 126 conforms at all times to that prevailing in the channel 140. Figure 4 shows in exaggeratetd form the clearances coursed by the fluid entering chamber 126, these clearances being indicated by the numerals 170 and 172.

Seal 132 surrounding the stem 92 to the left of the central land 135 largely prevents passage of fluid into the chamber 100. Such fluid as does pass this seal enters the chamber 100 via aperture 97. Any excess fluid collecting in the chamber bleeds past the seals 98 and through the previously mentioned cooperating passageways 106 and 108.

Valve 46 is of the so called open-center type; i.e., with the pump in operation and the spool 110 centered, the fluid is continuously circulated therethrough against the static pressure of the fluid confined at either side of the piston 21 in the power cylinder 20. Movement of the spool in either direction is resisted by the spring 114 in the chamber 126 aided by the fluid pressure in such chamber.

The fluid in the chamber 100 does not have a centering action. Rather, the purpose thereof is to preclude the possibility of the spool 110 "overshooting" its neutral position when returning from one extreme, with consequent undesired energization of the fluid motor in the opposite direction. It should be apparent that the return of the spool to its center position from the left, for instance, must necessarily be accompanied by the passage of fluid from the left side of the piston 94 through the passageway 96 to the right side of the piston. The diameter of the passageway 96 is carefully calculated to provide the proper degree of resistance.

In addition to its primary function of preventing "overshooting" of the spool, the dash pot arrangement involving the piston 94 serves to prevent undesirable reciprocation of the spool, which would otherwise occur from road shock. Such effort is additive with respect to the centering force of the spring 114 and the pressure of the fluid in the chamber 126.

To describe now the operation of the gear, let it be assumed that the operator of the vehicle wishes to negotiate a right turn and that the steering resistance is greater than the centering force acting upon the valve spool 110. On the clockwise rotation of the steering shaft, the spool (Fig. 2) will necessarily be pulled to the right so as to bring about partial or complete confinement of the fluid flow (depending upon the magnitude of the steering resistance) to the left side of the valve. Thus, the bulk of the flow is directed to the line 60 which is supplied through channel 150 and the passageway 154. Piston 21 in the cylinder 22, and with it the piston shaft 24, is accordingly caused to move to the left (Fig. 1) to carry the tie rod 18 in that direction.

When the operator rotates the steering shaft counterclockwise in order to negotiate a left turn, the action obviously will be opposite of that just described, the piston in this instance being caused to move to the right by the partial or complete confinement of the flow of the pressure fluid to the right side of the valve.

Displacement of the valve spool in either direction is marked by compression of the spring 114, by return of fluid from the chamber 126 to the annular channel 140 (via the clearance between the stem 92 and the surrounding parts and the passageway 144 in the central land 135) and by passage of fluid through the orifice 96 in the piston 94. Since the pressure of the fluid in the chamber 126, with the valve displaced, is necessarily the same as that in the energized side of the fluid motor and since the latter pressure is determined by the steering resistance, the operator is provided at the steering wheel with a "feel" substantially proportionate to the steering resistance.

On cessation of the effort at the steering wheel, the valve spool immediately re-centers and the dirigible wheels are returned to their straight-ahead position by the geometry of the steering linkage just as in the instance of a conventional unpowered steering system.

Having thus described and illustrated our invention, what we claim is:

1. A fluid power steering control valve including a pair of telescopically related members one of which is movable relative to the other, a pair of fluid chambers, one at either end of the inner of said members, one of said chambers confining a body of damping fluid together with a piston element connected to said movable member to move therewith and having therein an aperture interconnecting the faces thereof, the other of said chambers being open to the valve inlet and being adapted to contain fluid at a varying pressure corresponding to the pressure in said inlet thereby to present a resistance to displacement of said movable member of a magnitude determined by and substantially proportionate to the steering resistance, said last chamber being delineated in part by a pair of walls movable with said movable member, each such wall providing a surface for fluid reaction.

2. A fluid power steering control valve including a housing member and a spool member axially movable in either direction within said housing member, a pair of fluid chambers, one at either end of said spool member, one of said chambers confining a body of damping fluid together with a piston element fast to said spool member and having therein an aperture interconnecting the faces thereof, the other of said chambers being open to the valve inlet and being adapted to contain fluid at a varying pressure corresponding to the pressure in said inlet thereby to present a resistance to displacement of said spool member of a magnitude determined by and substantially proportionate to the steering resistance, said last chamber being delineated in part by a pair of walls movable with said spool member, each such wall providing a surface for fluid reaction.

3. An open-center fluid power steering control valve comprising a housing adapted for fixed connection to a steering member, said housing having an inlet port, an outlet port and an exhaust port, a spool element axially movable within said housing and provided with annular grooves corresponding to said ports, and means defining a pair of chambers one at either end of said spool element, one of said chambers being adapted to confine fluid at varying pressure for hydraulic reaction and being delineated in part by a pair of walls movable with said spool element, each such wall providing a reaction surface, the other of said chambers being adapted to confine a second body of fluid together with a piston providing a damping action, said piston being connected to said spool element and having an aperture therein interconnecting the faces thereof.

References Cited in the file of this patent

UNITED STATES PATENTS

| | | | |
|---|---|---|---|
| 772,115 | Thompson | Oct. 11, | 1904 |
| 1,171,085 | Beck | Feb. 8, | 1916 |
| 2,395,671 | Kleinhans | Feb. 26, | 1946 |
| 2,503,827 | Langmore | Apr. 11, | 1950 |
| 2,530,377 | Chattler | Nov. 21, | 1950 |
| 2,608,263 | Garrison | Aug. 26, | 1952 |
| 2,667,181 | Ashton | Jan. 26, | 1954 |
| 2,679,234 | Robinson | May 25, | 1954 |
| 2,757,643 | Hunter | Aug. 7, | 1956 |
| 2,798,461 | Gold | July 9, | 1957 |